United States Patent

Kita et al.

[11] Patent Number: 6,083,327
[45] Date of Patent: Jul. 4, 2000

[54] HYDROGEN OCCLUDING ALLOY

[75] Inventors: Kouichi Kita; Katsuo Sugahara; Masahiro Wada; Takuya Murai; Takeshi Isobe, all of Ohmiya, Japan

[73] Assignee: Mitsubishi Materials Corporation, Tokyo, Japan

[21] Appl. No.: 09/333,914

[22] Filed: Jun. 16, 1999

[30] Foreign Application Priority Data

Jun. 16, 1998 [JP] Japan .................................. 10-168127

[51] Int. Cl.$^7$ .................................................. C22C 19/03
[52] U.S. Cl. ........................ 148/429; 420/455; 420/460; 420/900; 429/223
[58] Field of Search ........................ 148/429; 420/455, 420/460, 900; 429/223

[56] References Cited

U.S. PATENT DOCUMENTS

| | | | |
|---|---|---|---|
| 5,242,766 | 9/1993 | Furukawa | 429/59 |
| 5,525,435 | 6/1996 | Pourarian | 429/218 |
| 5,900,334 | 5/1999 | Wada et al. | 429/218.2 |
| 5,916,519 | 6/1999 | Saito et al. | 420/455 |

*Primary Examiner*—John P Sheehan
*Attorney, Agent, or Firm*—Oblon, Spivak, McClelland, Maier & Neustadt, P.C.

[57] ABSTRACT

A Ni based hydrogen occluding alloy having the composition, comprising: by weight:

(i) 32–38% of at least one of La or Ce,
(ii) 0.1–17% Co,
(iii) 0.1–3.5% Al,
(iv) 0.5–10% Mn,
(v) 0.005–0.1% of hydrogen, with the balance being Ni and unavoidable impurities, wherein said alloy has a microstructure of a phase having a $Ce_2Ni_7$-type crystal structure and rare earth element hydride dispersively distributed in a matrix having a $CaCu_5$-type crystal structure and, wherein the amount of said phase having a $Ce_2Ni_7$-type crystal structure is 1–40% by area and the amount of said rare earth element hydride is 0.5–20% by area.

4 Claims, No Drawings

HYDROGEN OCCLUDING ALLOY

BACKGROUND OF THE INVENTION

1. Field of the Invention

The present invention relates to a hydrogen occluding alloy which exhibits high electric discharge characteristics (high output characteristics) in practical use for a battery cathode, in particular.

2. Discussion of the Background

Conventionally, for a battery cathode, for example, a hydrogen occluding alloy has been used in which the characteristics of the hydrogen absorption and desorption rates and the initial activation of the battery have been improved by action of a rare earth element hydride which is dispersively distributed in a matrix having a $CaCu_5$-type crystal structure. One such system based on a Ni based hydrogen occluding alloy is described in Japanese Patent Laid-Open No. 25528/1998, which has a composition comprising, by weight percent hereinafter "%" indicates "weight %"), (i) 32–38% of rare earth elements essentially consisting of La and /or Ce,
(ii) 0.1–17% of Co,
(iii) 0.5–3.5% of Al,
(iv) 0.5–10% of Mn,
(v) 0.005–0.5% of hydrogen and
the balance Ni and the unavoidable impurities. The alloy has a microstructure of a rare earth element hydride dispersively distributed in a matrix having a $CaCu_5$-type crystal structure in a ratio of 0.5–20% by area.

In addition, the hydrogen occluding alloy described above is typically made by preparing a molten alloy having a given composition and casting it into an ingot. When placed into practical use as a battery cathode, for example, the ingot is subjected to temper annealing in a vacuum or nonoxidizing inert gas atmosphere at a given temperature ranging from 900 and 1050° C. for a given time period, if necessary. Moreover, the as-cast or temper-annealed ingot is subjected to hydrogenation heat treatment in a hydrogen atmosphere at given temperature ranging from 600–950° C. for given time period to form rare earth element hydride and so that a microstructure is produced in which the rare earth element is dispersively distributed in a matrix having a $CaCu_5$-type crystal structure. Subsequently, the hydrogenated ingot is mechanically pulverized to a predetermined particle size or pulverized in a process which employs a pressurized hydrogen atmosphere which includes hydrogen absorption at a given temperature within the range from 10–200° C. and hydrogen desorption by vacuum evacuation.

In addition, when the hydrogen occluding alloy is used in, for example, a battery cathode, the battery can be practically used after an initial activation treatment in a pressurized hydrogen atmosphere for a given time period until the cathode including the hydrogen occluding alloy has a sufficient discharge capacity at an initial stage of use.

On the other hand, recent attempts have been made in a number of experiments to apply a hydrogen occluding alloy to a battery cathode which is required to have a larger output such that it can be used in electric tools, electrically assisted bicycles and electric automobiles. However, the hydrogen occluding alloy above and other alloys can not be practically used now as a battery cathode, since a sufficient output (high electric discharge characteristics) of the battery containing the cathode can not be obtained.

In view of the above problems, the present inventors have attempted to develop a hydrogen occluding alloy for use in the fabrication of a battery cathode, which exhibits a high output, thereby making it possible for practical use in battery construction. A hydrogen occluding alloy which has high hydrogen absorption and desorption rates and initial activation characteristics is particularly desired. As a result, the following has been found: When the conventional hydrogen occluding alloy of the as-cast or temper-annealed ingot described above is subjected to hydrogenation heat treatment to form a rare earth element hydride. If the alloy is heated from room temperature to a given temperature ranging from 200–400° C. in vacuum or inert gas atmosphere and subsequently the heat treatment is done at a temperature from 400–1000° C. for a given time period in a hydrogen atmosphere and cooled, the rare earth element hydride is formed which has a microstructure of a phase having a $Ce_2Ni_7$-type crystal structure dispersively distributed in a matrix having a $CaCu_5$-type crystal structure. As a result, after the heat treatment above, the alloy has a microstructure of a phase having a $Ce_2Ni_7$-type crystal structure and rare earth element hydride dispersively distributed in a matrix having a $CaCu_5$-type crystal structure. In addition, when the alloy above, having a microstructure in which the amount of a phase having a $Ce_2Ni_7$-type crystal structure is 1–40% by area and the amount of a rare earth element hydride is 0.5–20% by area, which is formed by controlling the condition of heating and hydrogenation heat treatment above, was used as a battery cathode, the output of the battery is very high because of the existence of the $Ce_2Ni_7$-type crystal structure. Moreover, high rates of hydrogen absorption and desorption are obtained, as well as good initial activation characteristics, both of which characteristics are significantly promoted by the presence of the rare earth element hydride.

SUMMARY OF THE INVENTION

Accordingly, one object of the present invention is to provide a hydrogen occluding alloy which possesses high electric discharge characteristics when used as a negative electrode in a battery.

Briefly, this object and other objects of the present invention as hereinafter will become more readily apparent can be attained by a Ni based hydrogen occluding alloy which has a composition, comprising: by weight, (i) 32–38% of at least one of La or Ce,
(ii) 0.1–17% Co,
(iii) 0.1–3.5% Al,
(iv) 0.5–10% Mn,
(v) 0.005–0.1% of hydrogen, with the balance being Ni and unavoidable impurities, wherein said alloy has a microstructure of a phase having a $Ce_2Ni_7$-type crystal structure and rare earth element hydride dispersively distributed in a matrix having a $CaCu_5$-type crystal structure and, wherein the amount of said phase having a $Ce_2Ni_7$-type crystal structure is 1–40% by area and the amount of said rare earth element hydride is 0.5–20% by area. When the alloy is put to practical use as a battery cathode, it becomes possible for a battery to exhibit high electric discharge characteristics (high output characteristics).

DETAILED DESCRIPTION OF THE PREFERRED EMBODIMENTS

The grounds for the choice of the composition of the Ni-based hydrogen occluding alloy and the rates of a phase of a $Ce_2Ni_7$-type crystal structure and the rare earth element hydride according to the present invention will now be described.

(a) Rare Earth Elements Essentially Consisting of La and Ce

These rare earth elements form a matrix of a $CaCu_5$ type crystal structure and exhibit hydrogen occlusion effects with Ni, and form rare earth element hydrides which contribute to increased hydrogen charge and discharge rates and improved initial activation, and form a phase of a $Ce_2Ni_7$ crystal structure which imparts high electric discharge characteristics to a battery. Since the discharge capacity of a battery decreases when the content of the Ce and La in the negative electrode is less than 32% or over 38%, the content of these elements in the electrode should be 32–38% and more preferably 33–35%.

(b) Co

The Co component is dissolved in the matrix and has effects which reduce volume expansion/shrinkage during hydrogen absorption/desorption, prevent pulverization of the alloy and prolong its usable life. If the Co content is less than 0.1%, these described effects cannot be achieved. Whereas, if the Co content is over 17%, the discharge capacity and initial activation effect tend to decrease. Accordingly, the Co content is preferably established 0.1–17%, more preferably 6–12%.

(c) Al

The Al component is dissolved in the matrix and improves corrosion resistance of the alloy. If the Al content is less than 0.1%, the desired corrosion resistance effects cannot be achieved. On the other hand, if the Al content exceeds 3.5%, the discharge of the battery capacity decreases. Therefore, the Al content is established at 0.1–3.5%, preferably 1–2%.

(d) Mn

The Mn component is dissolved in the matrix and decreases the equilibrium pressure for the dissociation of hydrogen, and contributes to increased battery discharge capacity. If the Mn content is less than 0.5%, the desired increase in discharge capacity cannot be achieved, whereas if the Mn content is over 10%, the battery tends to suffer a decrease in discharge capacity. Thus, the content ov Mn is established at 0.5–10%, preferably 3–8%.

(e) Hydrogen and Rare Earth Element Hydride

Hydrogen predominantly bonds to rare earth elements by thermal hydrogenation at a high temperature to form rare earth element hydrides which contribute to hydrogen absorption and desorption rates and improved initial activation. If the rare earth element content is less than 0.005%, the ratio of rare earth element hydride above is less than 0.5% by area, and thus the desired effects cannot be achieved. Whereas if the rare earth metal content exceeds 0.1%, rare earth element hydride forms at a ratio over 20% by area and, as a result, discharge capacity of the battery drastically decreases because the ratio of a phase of the $CaCu_5$ type crystal structure relatively lowers too much. Therefore, the rare earth metal content is established at 0.005–0.1%, most preferably 0.01–0.05% so that the resulting ratio of rare earth element hydride finely distributed in the matrix is 0.5–20% by area and more preferably 0.7–10% by area.

(f) The Phase of $Ce_2Ni_7$-Type Crystal Structure

By the existence of this phase in the alloy, the higher output becomes possible in application of a battery cathode. When the ratio of this phase is less than 1% by area, the desired high output cannot be achieved. Whereas a ratio exceeding 40% by area relatively decreases a phase of $CaCu_5$ type crystal structure and reduces the discharge capacity. Therefore, the content is determined to 1–40% by area and more preferably 5–20% by area.

Obviously, numerous modifications and variations of the present invention are possible in light of the above teachings. It is, therefore, to be understood that within the scope of the appended claims, the invention may be practiced otherwise than as specifically described herein.

The hydrogen occluding alloy of the present invention is now described in further detail with reference to an exemplifying embodiment.

Ni, La, Ce, Co, Al and Mn, as well as a misch metal, as raw materials, each preferably having a purity not less than 99.9%, were melted in a vacuum, e.g., in an ordinary high-frequency induction furnace, to prepare a Ni based molten alloy having a given composition, which was then cast into a cooled, e.g., water-cooled, casting mold, e.g., a copper casting mold, to form an ingot. The ingot was temper-annealed at a predetermined temperature within the range from 850–1050° C. for 10 hours in vacuum. Subsequently, when the ingot was hydrogenation annealed, heating from room temperature to a predetermined temperature within the range from 120–400° C. was done under a vacuum of $10^{-3}$ Torr to form an alloy having a microstructure characterized by a phase having a $Ce_2Ni_7$-type crystal structure dispersively distributed in a matrix having a $CaCu_5$-type crystal structure. Sequentially, after changing the vacuum condition to a pressurized hydrogen atmosphere of a predetermined pressure ranging from 1.1–10 bar, the alloy was heated continuously in this condition to a predetermined temperature within a range from 400–1000° C. and held at this temperature for 1 hour and then cooled to a temperature of 300° C. or less, so that the hydrogenation heat treatment was done. After this hydrogenation heat treatment, the alloy had a microstructure characterized by a phase having a $Ce_2Ni_7$-type crystal structure and rare earth element hydride dispersively distributed in a matrix having a $CaCu_5$-type crystal structure. Moreover, the alloy above was hydrogenation pulverized to a powder having a particle size of 0.074 mm (200 mesh) or less by hydrogen absorption at a predetermined temperature within the range from 10–200° C. in the cooling process above and hydrogen desorption by vacuum exhausting after the cooling process.

Hydrogen occluding alloys 1 through 21 were prepared by the process of the present invention (hereinafter referred to as alloy(s) of the present invention). Each alloy has the composition as set forth in Tables 1 and 2.

For purposes of comparison, a conventional hydrogen occluding alloy (hereinafter called "conventional alloy") having a composition shown in Table 2 was prepared under the same condition as the alloys of the present invention, except that the hydrogenation heat treatment after temper-annealing was conducted from room temperature to 850° C., holding 1 hour at 850° C. and cooling, all steps under a pressurized hydrogen atmosphere at 1.1 bar.

Microstructures of the resulting hydrogen occluding alloys were observed by transmission electron microscopy at a magnification of 50,000 and were measured by an electron diffraction analysis. Alloys 1–21 of the present invention have a microstructure in which a phase having a $Ce_2Ni_7$-type crystal structure and rare earth element hydride are dispersively distributed in a matrix of a $CaCu_5$-type crystal structure. On the other hand, the conventional alloy had a microstructure in which rare earth element hydride is only dispersively distributed in a matrix of a $CaCu_5$-type crystal structure. The ratio of area (percent by area) of a phase having a $Ce_2Ni_7$-type crystal structure and rare earth element hydride were measured and are shown in Tables 1 and 2.

The initial activation characteristics and the high electric discharge characteristic of high out-put characteristics of each of alloys 1–21 of the present invention above and conventional alloy were evaluated as follows:

(1) Evaluation of the Initial Activation Characteristic

Cuprous oxide ($Cu_2O$) as a conductive agent, polytetrafluoroethylene (PTFE) as a binder and carboxymethyl cellulose (CMC) as a thickener were added to each of the alloys 1–21 of the present invention and the conventional alloy, and each of the resulting pastes was loaded on a commercially available foamed nickel plate having a porosity of 95%. Each foamed nickel plate was dried and pressed, and shaped into a cut plate of 30 mm by 40 mm having a thickness of 0.40–0.43 mm. The amount of loaded active material was approximately 1.8 g. A thin nickel plate as a lead was welded to a side of each cut plate to form a negative electrode. On the other hand, a positive electrode was formed by preparing a paste from $Ni(OH)_2$ as an active material, cobalt monoxide (CoO) as a conductive agent, polytetrafluoroethylene (PTFE) as a binder and carboxymethyl cellulose (CMC) as a thickener. The paste was loaded on a foamed nickel plate. The foamed nickel plate was dried, pressed and shaped and then cut into a plate of 30 mm by 40 mm having a thickness of 0.71–0.73 mm. The thin nickel plate was then attached to a side of the cut plate. The positive electrodes were provided on both sides of the negative electrode through separators made of a polypropylene/polyethylene copolymer, and protection plates made of polyvinyl chloride were integrated therewith on both sides of the positive electrodes in order to prevent discharge of the active material from the outside of the positive electrodes. A battery was fabricated by inserting the integrated electrodes into a cell made of polyvinyl chloride and a 28% aqueous KOH solution as an electrolyte solution was poured into the cell.

The resulting battery was subjected to charge/discharge cycles under the conditions of a charging rate of 0.25 C, a discharging rate of 0.25 C, an amount of charge electric variable corresponding to 135% of the negative electrode capacity and the voltage of discharge terminated is -650 mV VS Hg/HgO. The charge/discharge cycles were repeated to until the battery showed a maximum discharge capacity, where one charge and discharge cycle is counted as one charge/discharge.

Table 3 shows the maximum discharge capacity obtained by the procedure set forth above, as well as the number of charge/discharge cycles as a measure which evaluates the initial activation, at which the discharge capacity is 97% of the maximum discharge capacity.

(2) Evaluation of High Electric Discharge Characteristics (High Out-Put Characteristics)

In order to evaluate high electric discharge characteristics of the alloys 1–21 of the present invention and the conventional alloy, batteries were prepared each of which contained one of the prepared alloys as a negative electrode and then the batteries were initially activated. After charging at a rate of 0.25–135% of maximum capacity of discharge, the time necessary for discharge of the battery till the negative electrode voltage was lowered to -650 mV VS Hg/HgO (i.e. 10 C discharge capacity) was measured at a discharging rate 40 times faster than the charging rate (i.e. 10 C). These results are also shown in Table 3.

ADVANTAGES

The results presented in Tables 1–3 evidently demonstrate that each of the alloys 1–21 of the present invention, which has a rare earth element hydride which is dispersively distributed in a matrix having a $CaCu_5$-type crystal structure, exhibit a similar excellent initial activation characteristic in comparison to the conventional alloy. The results also show a higher electric discharge characteristic (higher output characteristic) for the present alloy embodiments than that of the conventional alloy which has a phase of a $Ce_2Ni_7$-type crystal structure which is also dispersively distributed in said matrix.

As described above, since the hydrogen occluding alloy of the present invention exhibits significantly high electric discharge characteristics, when it is used as a negative electrode in a battery, it is, therefore, possible to employ the present alloy in batteries which are to be incorporated in various mechanical apparatuses which require a high electrical output from the battery.

TABLE 1

| | Composition (% by weight) | | | | | | | | | $Ce_2Ni_7$ | Rare earth |
| | Rare earth element | | | | | | | | $Ni^+$ | Phase | hydride |
| Kind | La | Ce | Pr | Nd | Co | Al | Mn | Hydrogen | Impurities | (Area %) | (Area %) |
| --- | --- | --- | --- | --- | --- | --- | --- | --- | --- | --- | --- |
| Alloys of the present invention | | | | | | | | | | | |
| 1 | 13.7 | 13.5 | 1.94 | 5.04 | 7.81 | 1.31 | 7.90 | 0.015 | Balance | 6.93 | 3.17 |
| 2 | 10.1 | 18.7 | 2.18 | 6.35 | 16.58 | 1.48 | 1.13 | 0.059 | Balance | 38.76 | 9.40 |
| 3 | 28.8 | 0.94 | 1.37 | 2.34 | 6.87 | 2.13 | 3.85 | 0.042 | Balance | 6.29 | 1.28 |
| 4 | 23.7 | 5.87 | 1.87 | 3.43 | 5.64 | 1.55 | 7.75 | 0.010 | Balance | 23.34 | 2.75 |
| 5 | 28.7 | 0.93 | 1.36 | 2.33 | 6.92 | 1.35 | 1.95 | 0.065 | Balance | 3.55 | 2.91 |
| 6 | 20.1 | 7.41 | 1.79 | 3.64 | 0.18 | 0.79 | 9.10 | 0.008 | Balance | 1.24 | 1.66 |
| 7 | 13.9 | 13.7 | 1.97 | 5.11 | 9.67 | 1.29 | 7.88 | 0.023 | Balance | 12.37 | 4.89 |
| 8 | 28.5 | 0.84 | 1.41 | 2.61 | 6.89 | 3.48 | 3.53 | 0.008 | Balance | 1.99 | 0.51 |
| 9 | 10.3 | 16.31 | 1.99 | 5.64 | 9.83 | 0.52 | 9.47 | 0.037 | Balance | 3.41 | 7.86 |
| 10 | 28.5 | 0.90 | 1.40 | 2.43 | 11.23 | 1.34 | 3.85 | 0.056 | Balance | 5.21 | 2.47 |

TABLE 2

| Kind | Composition (% by weight) | | | | | | | | $Ni^+$ Impurities | $Ce_2Ni_7$ Phase (Area %) | Rare earth hydride (Area %) |
| --- | --- | --- | --- | --- | --- | --- | --- | --- | --- | --- | --- |
| | Rare earth element | | | | Co | Al | Mn | Hydrogen | | | |
| | La | Ce | Pr | Nd | | | | | | | |
| Alloys of the present invention | | | | | | | | | | | |
| 11 | 26.7 | 2.36 | 1.73 | 2.57 | 14.4 | 1.29 | 8.02 | 0.006 | Balance | 10.82 | 0.73 |
| 12 | 12.0 | 15.7 | 2.04 | 5.59 | 9.94 | 0.95 | 5.54 | 0.043 | Balance | 17.68 | 8.47 |
| 13 | 28.3 | 0.89 | 1.39 | 2.41 | 6.86 | 1.19 | 7.90 | 0.030 | Balance | 2.75 | 0.81 |
| 14 | 15.0 | 14.9 | 2.13 | 5.54 | 15.9 | 0.54 | 4.13 | 0.093 | Balance | 7.45 | 19.23 |
| 15 | 10.0 | 16.1 | 1.47 | 5.81 | 6.88 | 1.20 | 3.83 | 0.058 | Balance | 4.31 | 1.62 |
| 16 | 20.1 | 9.55 | 1.97 | 4.29 | 11.6 | 3.35 | 0.57 | 0.073 | Balance | 15.43 | 10.30 |
| 17 | 13.0 | 14.1 | 1.95 | 5.15 | 9.21 | 2.24 | 4.56 | 0.025 | Balance | 5.79 | 5.73 |
| 18 | 28.7 | 0.90 | 1.40 | 2.44 | 6.93 | 1.21 | 0.52 | 0.085 | Balance | 2.16 | 3.87 |
| 19 | 17.9 | 9.34 | 1.84 | 4.31 | 6.93 | 1.31 | 3.87 | 0.060 | Balance | 7.64 | 1.75 |
| 20 | 9.02 | 18.7 | 2.12 | 6.27 | 12.23 | 1.32 | 2.69 | 0.070 | Balance | 4.95 | 16.01 |
| 21 | 20.7 | 7.46 | 1.82 | 3.70 | 11.0 | 0.12 | 9.00 | 0.029 | Balance | 3.75 | 4.16 |
| Conventional alloy | 28.4 | 0.83 | 1.46 | 2.59 | 8.36 | 1.20 | 3.80 | 0.062 | Balance | — | 3.11 |

TABLE 3

| Kind | | Maximum discharge Capacity (mAh/g) | Charge/discharge cycles (numbers) | 10C discharge Capacity (mA/g) |
| --- | --- | --- | --- | --- |
| Alloys of the present invention | 1 | 345 | 2 | 168 |
| | 2 | 348 | 3 | 133 |
| | 3 | 362 | 3 | 105 |
| | 4 | 359 | 4 | 114 |
| | 5 | 360 | 3 | 120 |
| | 6 | 347 | 4 | 101 |
| | 7 | 362 | 2 | 169 |
| | 8 | 353 | 4 | 110 |
| | 9 | 346 | 3 | 134 |
| | 10 | 361 | 4 | 108 |
| | 11 | 354 | 3 | 154 |
| | 12 | 350 | 2 | 162 |
| | 13 | 363 | 2 | 149 |
| | 14 | 343 | 2 | 136 |
| | 15 | 354 | 4 | 121 |
| | 16 | 349 | 2 | 153 |
| | 17 | 352 | 2 | 167 |
| | 18 | 355 | 4 | 110 |
| | 19 | 357 | 3 | 139 |
| | 20 | 347 | 2 | 158 |
| | 21 | 356 | 3 | 141 |
| Conventional Alloy | | 361 | 3 | 29 |

The disclosure of German priority application serial number Hei 10-168127 filed Jun. 16, 1998 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A Ni based hydrogen occluding alloy having the composition, comprising:

by weight:
(i) 32–38% of at least one of La or Ce,
(ii) 0.1–17% Co,
(iii) 0.1–3.5% Al,
(iv) 0.5–10% Mn,
(v) 0.005–0.1% of hydrogen, with
the balance being Ni and unavoidable impurities, wherein said alloy has a microstructure of a phase having a $Ce_2Ni_7$ crystal structure and rare earth element hydride dispersed in a matrix having a $CaCu_5$ crystal structure and, wherein the amount of said phase having a $Ce_2Ni_7$ crystal structure is 1–40% by area and the amount of said rare earth element hydride is 0.5–20% by area.

2. The hydrogen occluding alloy of claim 1, wherein said La or Ce content is 33–35%, the Co content is 6–12%, the Al content is 1–2%, the Mn content is 3–8% and the hydrogen content is 0.01–0.05%.

3. The hydrogen occluding alloy of claim 2, wherein the amount of said rare earth metal hydride is 0.7–10%.

4. The hydrogen occluding alloy of claim 2, wherein the amount of said phase having a $Ce_2Ni_7$ crystal structure is 5–20% by area.

* * * * *